United States Patent
Cano

(10) Patent No.: US 6,722,399 B1
(45) Date of Patent: Apr. 20, 2004

(54) SYSTEM AND METHOD FOR UNLOADING COMPRESSED GAS

(75) Inventor: Gregory Michael Cano, Calgary (CA)

(73) Assignee: TransCanada Pipelines Services, Ltd., Calgary (CA)

( * ) Notice: Subject to any disclaimer, the term of this patent is extended or adjusted under 35 U.S.C. 154(b) by 0 days.

(21) Appl. No.: 10/282,561

(22) Filed: Oct. 29, 2002

(51) Int. Cl.$^7$ ................................................. B65B 1/04
(52) U.S. Cl. ........................ 141/67; 141/2; 141/18; 141/47; 141/95
(58) Field of Search .................... 141/2–5, 18, 21, 141/25, 27, 47, 51, 67, 83, 95, 197, 231, 248

(56) References Cited

U.S. PATENT DOCUMENTS

| | | |
|---|---|---|
| 3,307,512 A | 3/1967 | Fell |
| 3,544,289 A | 12/1970 | Berlin |
| 3,831,811 A | 8/1974 | Becker |
| 4,446,804 A | 5/1984 | Kristiansen et al. |
| 4,483,376 A | 11/1984 | Bresie et al. |
| 4,750,869 A | 6/1988 | Shipman, III |
| 5,454,408 A | 10/1995 | DiBella et al. |
| 5,884,675 A | 3/1999 | Krasnov |
| 6,112,528 A | 9/2000 | Rigby |
| 6,202,707 B1 | 3/2001 | Woodall et al. |
| 6,257,017 B1 | 7/2001 | Kimble |
| 6,339,996 B1 | 1/2002 | Campbell |

FOREIGN PATENT DOCUMENTS

| | | |
|---|---|---|
| EP | 1146277 A1 | 10/2001 |
| WO | WO 97/16678 A1 | 5/1997 |

OTHER PUBLICATIONS

*Jet Compressors Boost Production Rates of Marginal Wells*, Transvac Systems Limited website located at www.transvac.demon.co.uk/appsheets/gjc010.htm on Oct. 2, 2002. (2 pages).

*Oil Industry*, located on the Internet at www.e-quipment.com.au/gasnoil.htm on Sep. 28, 2002. (6 pages).

*Install Ejector*, Natural Gas EPA Pollution Preventer—Partner Reported Opportunities for Reducing Methane Emissions. No date available. (1 page).

Primary Examiner—Gregory L. Huson
Assistant Examiner—Peter deVore
(74) Attorney, Agent, or Firm—Mayer Brown Rowe & Maw LLP

(57) ABSTRACT

A system and method for transferring compressed gas from a supply point to a delivery point including an ejector, high and low pressure headers, and a plurality of containers that hold compressed gas and are selectively connected to the high and low pressure headers. The ejector uses energy created from the high pressure compressed gas to draw residual pressure gas out of the containers. The system and method also both preferably include a control system for controlling compressed gas flow through the system.

20 Claims, 4 Drawing Sheets

SYSTEM AND METHOD FOR UNLOADING COMPRESSED GAS

FIELD OF THE INVENTION

This invention relates generally to compressed gas transportation schemes and in particular to compressed gas delivery systems and methods for unloading compressed gas.

BACKGROUND OF THE INVENTION

Natural gas is a colorless, odorless, fuel that burns cleaner than many other traditional fossil fuels. It is used for heating, cooling, production of electricity and it finds many uses in industry. Increasingly, natural gas is being used in combination with other fuels to improve their environmental performance and decrease pollution. It is one of the most popular forms of energy today.

The efficient and effective movement of natural gas from producing regions to consumption regions requires an extensive and elaborate transportation system. In many instances, natural gas produced from a particular well will have to travel a great distance to reach its point of use. The transportation system for natural gas consists of a complex network of pipelines, designed to quickly and efficiently transfer natural gas from its origin, to areas of high natural gas demand. Alternative transportation and delivery systems for natural gas, where pipelines are not possible or feasible, include the use of vehicles such as barges, ships, trains, and trucks. These systems generally consist of a multitude of high pressure storage containers on the vehicles and a delivery system which is connected to the storage containers at the delivery point.

Normally, delivery sites are designed for a distinct purpose and constructed to perform within specific parameters. For example, pipelines generally can receive higher pressure compressed gas—approximately 1000 psig—at variable flow rates from a particular delivery system, while power plants need a constant flow of natural gas at lower pressures—approximately 300–400 psig. Location of the delivery site and materials used in its construction are also important variables that factor into designing an appropriate delivery system. For example, depending on the temperature and pressure tolerances involved, heat may be required during the delivery process.

In the latter transportation system using vehicles, once the compressed natural gas arrives at a delivery site (e.g. a power plant or pipeline), it is connected to a delivery system. Here, the high pressure compressed gas will initially flow on its own from the containers through the system towards a delivery point. This is because pressure at the delivery point is generally lower than the container pressure. In fact, due to the significant pressure differential between container pressure and delivery point pressure, some systems also provide a means of letting down the container pressure to slightly above pressure at the delivery point.

As the high pressure gas is delivered, the container pressure will eventually approach delivery point pressure. When the container pressure reaches the delivery point pressure, the residual gas left in the containers will no longer flow on its own. This residual container gas will remain in the containers unless it can be removed by other methods. For example, some systems use a compressor to compress the residual container gas up to delivery pressure, causing it to be removed from the system. These systems are inefficient because they require an independent source of energy to raise the pressure of gas from residual pressure to delivery pressure. This results in increased capital and operating costs.

Accordingly, there is a need for a system for transferring compressed gas from a supply point to a delivery point that optimizes the volume of gas delivered efficiently, regardless of the construction and operating parameters, while maintaining reasonable capital and operating costs. Other needs will become apparent in view of the following detailed description, in conjunction with the drawings.

SUMMARY OF THE INVENTION

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the present invention. Together with the description, the drawings serve to explain the principles of the invention.

The invention provides a system and a method for transferring compressed gas (e.g. natural gas, helium, carbon dioxide, hydrogen, etc.) from a supply point to a delivery point using an ejector, which works to maintain efficiency, without significantly increasing capital or operational costs. The system can be configured to transfer compressed gas from any number of containers or container banks. Accordingly, a multitude of system configurations of the present invention are possible. For example, one preferred embodiment of the present invention includes the following components: an ejector, a high pressure header, a low pressure header, flow and pressure control valves, flow and pressure indicating sensors, a control system, and a plurality of containers banks (or containers) holding compressed gas.

Initially, a required flow rate of compressed gas, corresponding to the fuel requirements of the delivery point (i.e. a power plant or the set point of flow into a pipeline) is entered into the control system. At the start of the delivery cycle, a first container bank is opened to the high pressure header. Compressed gas from the first container bank flows on its own to the delivery point, as it exceeds the delivery point pressure. Preferably, flow and pressure sensors continuously monitor compressed gas flow rates and system pressures and transmit this information to the control system. The control system processes this information, using it to operate flow and pressure control valves which throttle open and closed, thereby controlling the flow of gas to maintain system pressure and sustain the required flow rate.

Container gas flow will decrease as pressure drops in the first container bank, which will trigger the control system to open the next full container bank to the high pressure header and switch the first container bank from the high pressure header to the low pressure header. This configuration allows compressed gas from the high pressure header to be in flow communication with an ejector motive gas inlet, and allows compressed gas from the low pressure header to be in flow communication with an ejector suction inlet. As used herein, the term "flow communication" means any method of connecting one structure to another which allows fluid to flow. The term flow communication includes not only direct connections, but also connections that may contain intermediate structures, such as valves, flow sensors, pressure sensors, splitters, etc. Accordingly, the amount of total gas flow out of the ejector will be a combination of the low pressure suction gas and the high pressure motive gas, all regulated by the control system.

As the pressure in the high pressure header drops, the amount of suction at the ejector suction inlet will drop, thereby requiring more gas from the high pressure header to maintain ejector output at the required delivery flow rate. Eventually, however, there will not be enough high pressure gas to effectively draw gas through the ejector from the low pressure header or deliver the compressed gas to the delivery point. At this point, the banks of cylinders will have to be switched again. This process will continue until all the container banks are at the residual pressure of the system.

Other embodiments of the present invention may include a compressor which can work with the ejector either in series or in parallel to ensure optimum ejector performance or constant delivery pressure. When the ejector is operating to maintain desired pressures and flow rates on its own, the compressor is turned off, thereby maintaining system efficiency and minimizing operational costs. For example, a compressor can be positioned in series, upstream of the ejector motive gas inlet or the ejector suction inlet, ensuring that compressed gas entering the ejector is constantly at optimum pressure. Alternatively, a compressor can be positioned in series downstream of the ejector or in parallel with the ejector, ensuring constant pressure at the delivery point. Unlike other systems, which do not use ejectors, the present invention uses a compressor only as necessary to assist in obtaining optimal ejector performance or a constant delivery pressure. It will therefore be appreciated that a compressor is not a necessary element of the present invention.

DESCRIPTION OF THE PREFERRED EMBODIMENT

Figure 1:
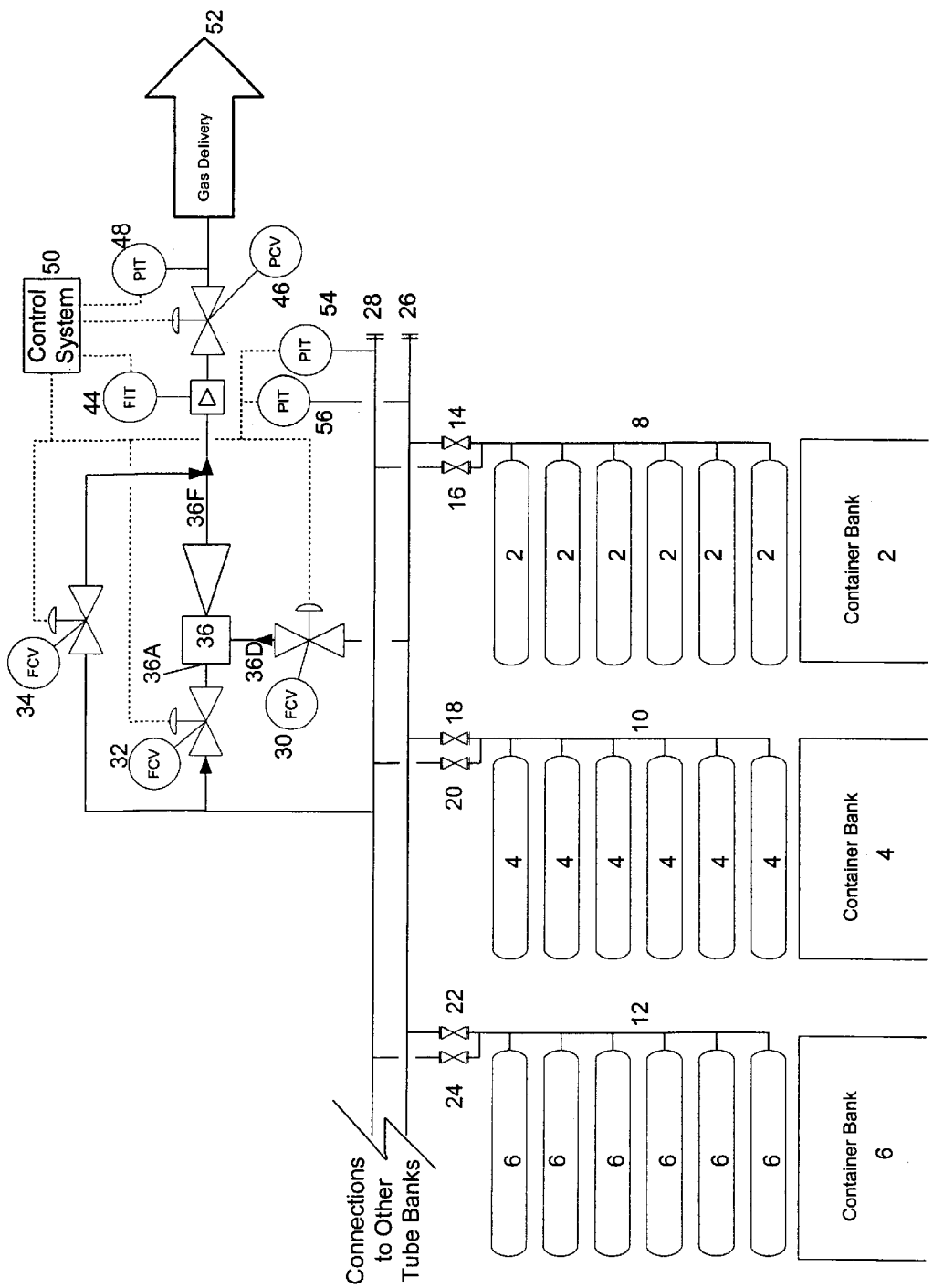
FIG. 1 is a schematic diagram of one embodiment of the present invention for transferring compressed gas from a supply point to a delivery point.

While the present invention is capable of embodiment in various forms, there is shown in the drawings and will hereinafter be described as a preferred embodiment with the understanding that the present disclosure is to be considered an exemplification of the invention, and is not intended to limit the invention to the specific embodiments illustrated.

Referring to FIG. 1, one embodiment of the present invention preferably comprises a plurality of containers arranged in container banks 2, 4, 6 holding compressed gas, pressurized to approximately 3000 psig. Three container banks 2, 4, 6 are shown, each comprising six individual containers. Those skilled in the art are familiar with the wide variety of container constructions, which may include flow sensors, pressure relief valves, pressure sensors, indicators, and alarm systems (not shown), and are not essential to understanding the practice of this invention. Further, the present invention is not limited to any specific number or arrangement of containers or container banks—any type of container suitable for holding compressed gas can be used in the present invention.

FIG. 1 shows one embodiment of the present invention for delivering compressed gas to a location that requires a constant flow of gas at a constant pressure (e.g. approximately 500 psig). However, it will be understood that the present invention will also function when variable delivery flow rates and volumes are required. Each container bank 2, 4, 6 connects to a manifold 8, 10, 12 which selectively leads to both a high pressure header 28 and a low pressure header 26. Each manifold 8, 10, 12 is preferably connected to both the high pressure header 28 and the low pressure header 26 by switching valves 16, 20, 24 and 14, 18, 22, respectively. Both the high pressure header 28 and the low pressure header 26 are in flow communication with an ejector 36 at different points; the high pressure header 28 is in flow communication with the motive gas inlet 36A of the ejector 36, while the low pressure header 26 is in flow communication with the suction inlet 36D of the ejector 36.

Figure 2:
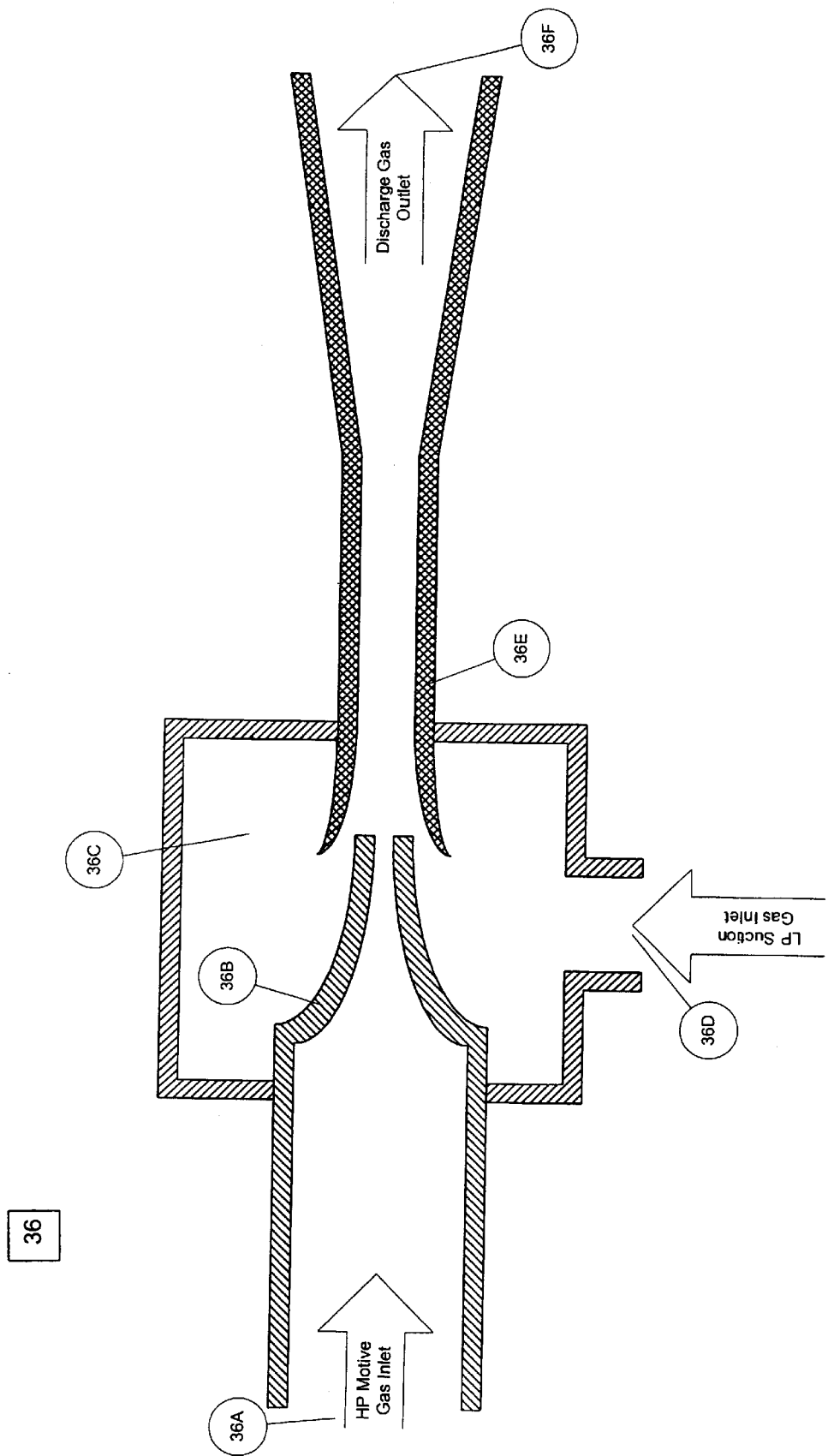
FIG. 2 is a cross section view of one type of ejector that can be used in the present invention.

With reference to FIG. 2, the ejector 36 comprises a motive gas inlet 36A, a motive gas nozzle 36B, a suction chamber 36C, a suction inlet 36D, a diffuser 36E and a diffuser outlet 36F. Gas from the high pressure header enters the motive gas inlet 36A and is directed to the motive gas nozzle 36B. At this point, pressure energy from the high pressure gas is converted to velocity in the nozzle. This increase in velocity lowers suction chamber 36C pressure, which acts to draw lower pressure gas from the suction inlet 36D into the suction chamber 36C. This lower pressure gas, now inside the suction chamber 36C, mixes with the high velocity gas exiting the motive gas nozzle 36B, and the mixed gas then flows out of the suction chamber 36D into the diffuser 36E. In the diffuser 36E, the mixed gas expands, its velocity slows, and the velocity energy is converted to pressure energy. The mixed gas at the diffuser outlet 36F has a substantially higher pressure than the pressure in the suction chamber 36C.

Figure 3:
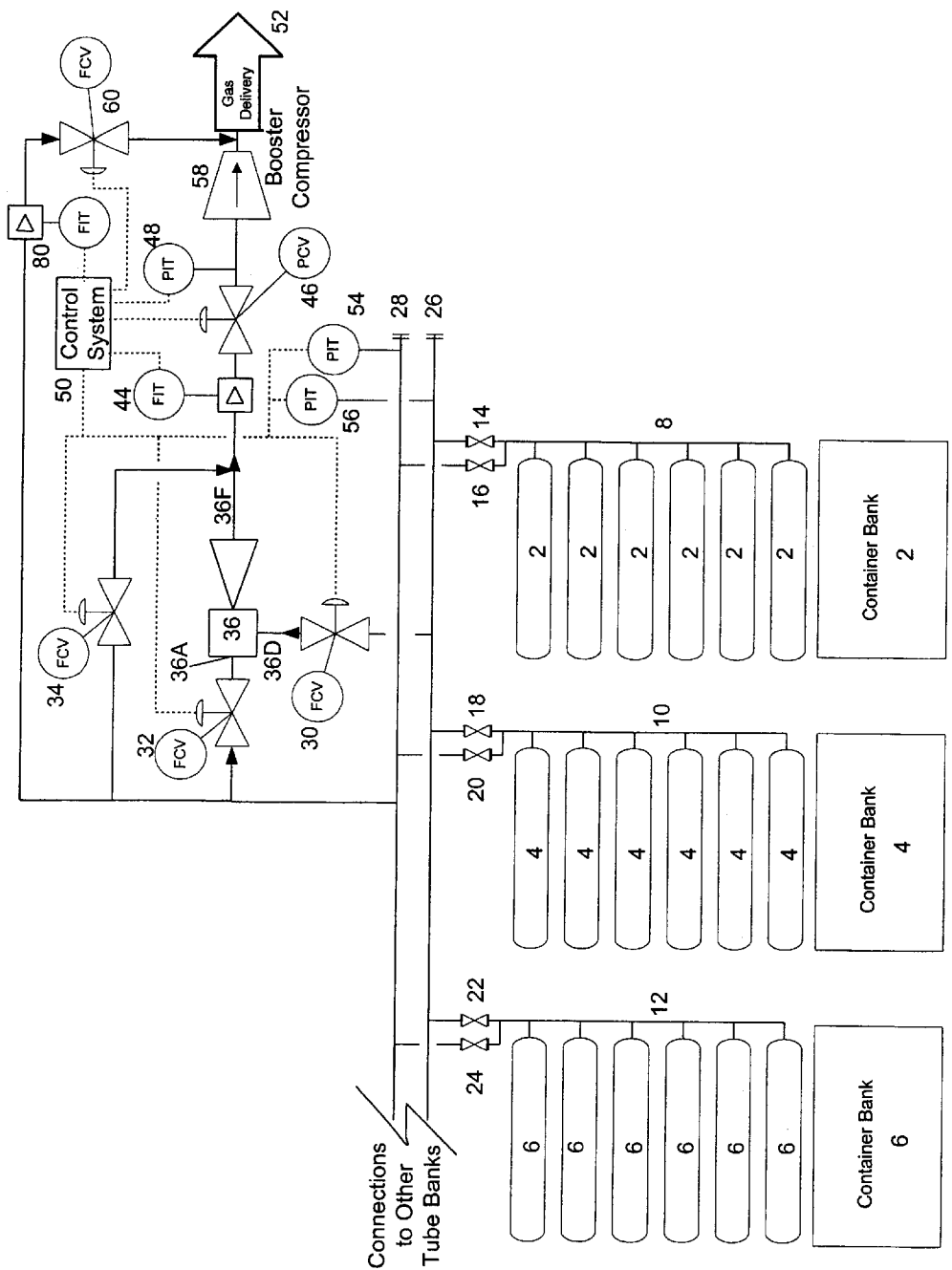
FIG. 3 is a schematic diagram of another embodiment of the present invention for transferring compressed gas from a supply point to a delivery point, wherein a compressor is used in series with an ejector.
Figure 4:
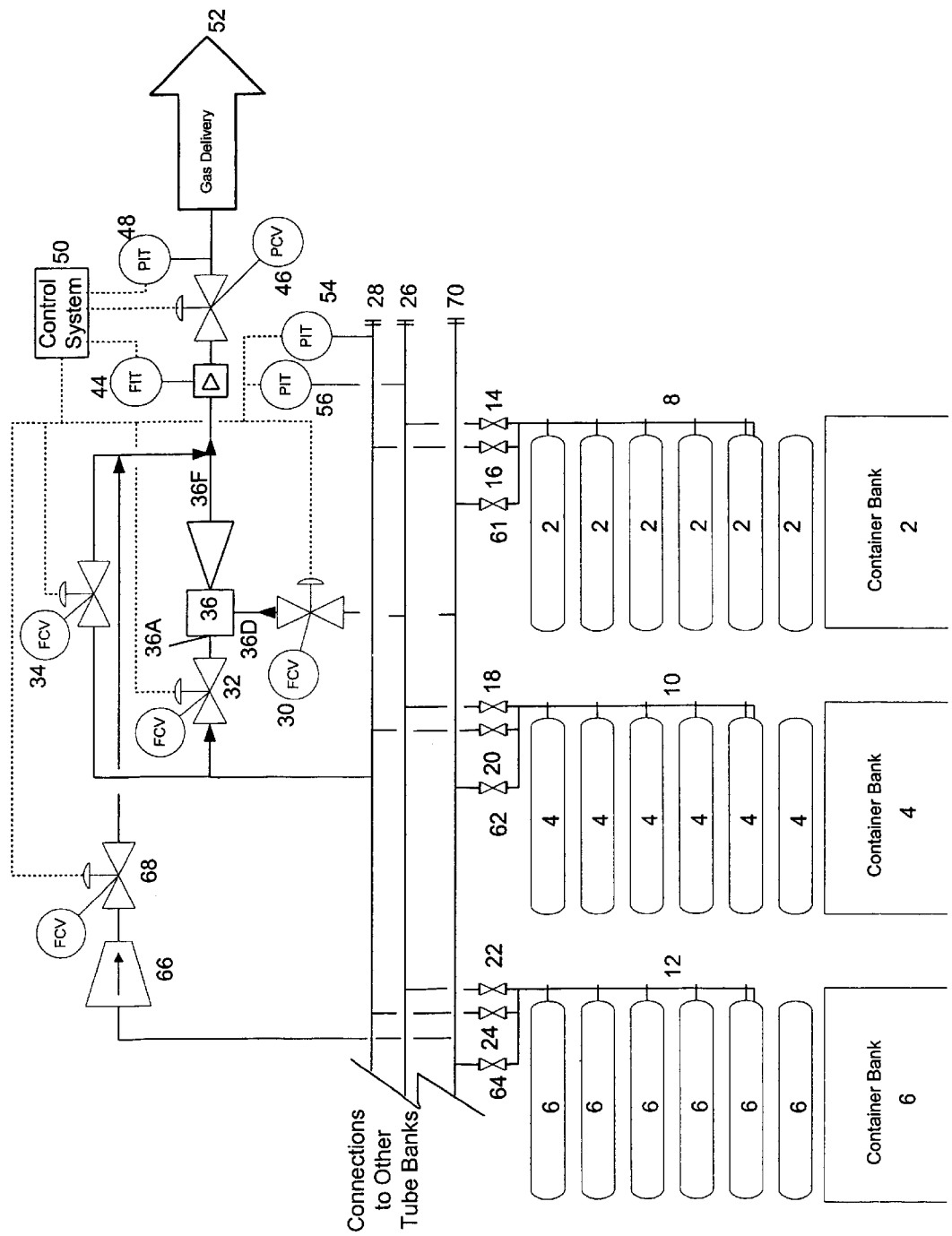
FIG. 4 is a schematic diagram of another embodiment of the present invention for transferring compressed gas from a supply point to a delivery point, wherein a compressor is used in parallel with an ejector.

Although the preferred embodiments depicted in FIGS. 1, 3, and 4 all envision use of a fixed geometry ejector, any type of ejector can be used, including a variable geometry ejector (i.e. variable orifice ejector) which may further improve system flexibility and efficiency. The ejector 36 may be of the type commercially available through Transvac Systems Limited of Derbyshire, England.

Another key component of one preferred embodiment of the present invention is an automated control system 50, although manual operation is also possible and may be more desirable depending on the operational conditions of a particular project. Referring again to FIG. 1, the control system 50 consists of an computer interface (not shown), various flow and pressure sensors 44, 48, 54, 56, and various flow and pressure control valves 30, 32, 34, 46. Flow and pressure sensors 44, 48, 54, 56, which may be venturi, orafice, ultrasonic, or some other sensor type, transmit flow rate and system pressure information to the control system 50, where the information is processed. System components, including flow and pressure control valves 30, 32, 34, 46, are then automatically adjusted to ensure maximum system efficiency and safety are maintained. These flow and pressure control valves 30, 32, 34, 46 can be any type of throttling valve that will allow various volumes of high pressure gas to pass through the system. For example, globe, needle or disk type choke valves may be required for systems operating with higher pressure wet gas, whereas v-ball type control valves may work better for lower pressure dry gas. One with skill in the art will be able to select the valve type and trim required for each particular project based on the operating conditions of the related delivery site. In the case of a variable geometry ejector, the control system may control the ejector geometry to maintain the highest efficiency of the ejector system based upon the constantly changing pressures in the high and low pressure headers.

Furthermore, other combinations of flow control and pressure control valves and sensors can be used to control the system. The optimum control configuration and switching pressures will be dependent on the process conditions of a given project, including but not limited to: container pressure, required flow rate, required delivery pressure, consistency of the flow required, and gas composition.

In one embodiment, two flow control valves 32, 34 are connected to the high pressure header 28; one acts as a bypass flow control valve 34, controlling flow of gas from the high pressure header 28 directly to the delivery point 52, while the other flow control valve 32 regulates gas flow into the motive gas inlet 36A of the ejector 36. A third flow control valve 30 is positioned at the suction inlet 36D of the ejector 36. These flow control valves 30, 32, 34 throttle open and closed to maintain the required delivery flow rate and ejector efficiency. Pressure sensors 54, 56 monitor header pressures at the high and low pressure headers 26, 28 and transmit this information to the control system 50 where it is used to provide the ratio set points for the flow control valves 30 and 32 to allow the ejector to operate at its most efficient point on its operating curve. The pressure measurements are also used to operate valves 14, 16, 18, 20, 22, and 24, which switch the container banks 2, 4, 6 to the two headers 26, 28 at optimum pressure.

The last three components of one embodiment of the control system 50 are connected downstream of the ejector 36—a flow sensor 44, a pressure control valve 46, and a pressure sensor 48. Sensors 44, 48 detect the gas pressure and flow rate of compressed gas heading from the system to the delivery point 52 and relay that information to the control system 50, which directs the pressure control valve 46 to throttle open and closed to maintain delivery point pressure as required. It is also used as an overriding control on valves 30 and 32 to control flow to the delivery point. Again, the aforementioned sensors and bypass capability are preferred, but not required for operation of the present invention.

Referring again to FIG. 1 for a preferred operation of the system, compressed gas from the first container bank 2 flows through a manifold 8 into a high pressure header 28 through a high pressure header switching valve 16. The compressed gas then is directed around the ejector 36 through the bypass flow control valve 34 and the delivery point 52, with the pressure control valve 46 controlling delivery point pressure at the desired level. As the pressure in the first container bank 2 declines, the flow control valve 34 will open maintaining delivery flow at a constant, desired rate. Once the pressure in the first container bank 2 declines to the point where flow cannot be maintained at the desired rate (as measured by a flow sensor 44 and transmitted to the control system 50) the control system 50 will close the bypass flow control valve 34 and switch gas flow from the first container bank 2 to the low pressure header 26 by opening the low pressure header switching valve 14 and closing the high pressure header switching valve 16. Additionally, the control system 50 will allow compressed gas from the second container bank 4 to be routed to the high pressure header 28 by opening the high pressure header switching valve 20.

High pressure compressed gas from the second container bank 4 in the high pressure header 28 is then routed through a flow control valve 32 which leads to the motive gas inlet 36A of the ejector 36. Meanwhile, the lower pressure residual gas from the first container bank 2 in the low pressure header 26 is routed through a flow control valve 30 which leads to the suction inlet 36D of the ejector 36. The motive gas flow through the ejector 36 creates a low pressure region at the suction inlet 36D of the ejector 36 that is lower than the pressure at the diffuser outlet 36F. This creates a motive force which draws lower pressure residual gas from the first container bank 2 into the ejector 36 through the suction inlet 36D. Inside the ejector 36, lower pressure residual gas mixes with the higher pressure motive gas resulting in an outlet pressure of the combined gases at the diffuser outlet 36F which is at or above the required delivery point pressure. As the container bank gases decline in pressure, flow control valves 30, 32 at the motive gas inlet 36A and suction inlet 36D of the ejector 36 adjust to maintain a constant outlet flow at the desired rate for delivery, while maintaining ejector efficiency.

Once the compressed gas from the second container bank 4 decreases to a predetermined pressure, approximately 1000 psig for this example, it no longer has enough motive force to efficiently draw lower pressure gas through the suction inlet 36D of the ejector 36. At this point, the first container bank 2 is completely secured by closing both its high and low pressure header switching valves 14, 16. Although some compressed gas will remain in the first container bank 2, its pressure will be below delivery point pressure(e.g. in this case approximately 175 to 200 psig below delivery pressure).

Meanwhile, residual lower pressure compressed gas from the second container bank 4 is switched to the low pressure header 26 by opening its low pressure header switching valve 18 and closing its high pressure header switching valve 20. High pressure compressed gas from the third container bank 6 will be routed through its manifold 12 and high pressure header switching valve 24 to the high pressure header 28, and then to the motive gas inlet 36A of the ejector 36 through a flow control valve 32. At the same time, lower pressure gas from the second container bank 4 in the low pressure header 26 is routed through the flow control valve 30 at the suction inlet 36D of the ejector 36. During configuration changes and at times of low gas flow, the bypass flow control valve 34 can be opened to ensure gas flow to the delivery point 52 is maintained at the required rate.

From here, the system is controlled and operated in the same manner as described in the previous configuration, and the process will continue until all container banks in a given delivery system are emptied to residual pressure. Some delivery sites will require a continuous supply of compressed gas and operate using multiple delivery systems which offload one after the other. In this situation, in order to maintain a constant flow and provide the most efficient offloading of compressed gas, the first container bank in a second delivery system could be used to reduce the last container bank in the first delivery system to residual pressure. This process can be repeated until all delivery systems are emptied to residual pressure.

Referring to FIG. 3, another embodiment of the present invention combines the ejector 36 with a booster compressor 58 to provide a higher delivery pressure. In this configuration, the process works the same except that gas flow does not go from the diffuser outlet 36F of the ejector 36, through the pressure control valve 46, and directly to the delivery point 52. Rather the gas flow from the diffuser outlet 36F is connected to a booster compressor 58 which may compress the gas further, providing a higher delivery pressure to the delivery point 52 than the ejector 36 could by operating alone. Additionally, a bypass flow control valve 60 provides a means of directing the high pressure compressed gas directly from the high pressure header 28 to the delivery point 52 to achieve optimum efficiency of the combined system. Flow sensor 80 provides a measurement of this flow to allow the control system to maintain constant delivery flow.

Referring to FIG. 4, another embodiment of the present invention provides a lower residual pressure in the containers 2, 4, 6 by adding a compressor header 70, and compressor header switching valves 61, 62, 64 through which gas from the containers 2, 4, 6 can travel to the delivery point 52 by way of an attached compressor 66. A flow control valve 68 downstream of the attached compressor will control gas flow to the delivery point 52. The attached compressor 66 can lower pressure in the containers 2, 4, 6 to as low as is practical or economic through various configurations of the header switching valves 14, 16, 18, 20, 22, 24, 61, 62, 64. In all figures, details of the compressor control are not shown as they are typical of compressor installations and are well known in the art.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A system for unloading compressed gas comprising:
   a high pressure header;
   a low pressure header;
   a plurality of containers for holding compressed gas, wherein at least one of said containers is in flow communication with both the high pressure header and the low pressure header and wherein another one of said containers is in flow communication with at least the high pressure header;
   an ejector, having an ejector motive gas inlet, a diffuser outlet, and an ejector suction inlet;
   wherein the high pressure header is in flow communication with the ejector motive gas inlet; and
   wherein the low pressure header is in flow communication with the ejector suction inlet.

2. The system of claim 1, further comprising a plurality of valves which control the flow of compressed gas through the system.

3. The system of claim 1, further comprising a pressure control valve being in flow communication with the diffuser outlet.

4. The system of claim 1, further comprising a main flow sensor being in flow communication with the diffuser outlet.

5. The system of claim 1, further comprising a control system, wherein the control system selectively controls compressed gas flow from at least one container to the high pressure header and low pressure header.

6. The system of claim 5, wherein the control system controls the compressed gas flow through the ejector based on the differential pressure between the ejector motive gas inlet and the ejector suction inlet.

7. The system of claim 1, further comprising at least one compressor, wherein the compressor is in flow communication with the ejector in series.

8. The system of claim 1, further comprising at least one compressor, wherein the compressor is in flow communication with the ejector in parallel.

9. The system of claim 1, wherein the compressed gas is compressed natural gas.

10. The system of claim 1, wherein the containers comprise container banks, each container bank having a container bank header, wherein each container bank header has a separate connection to the high pressure header and a separate connection to the low pressure header.

11. A method for transferring compressed gas from at least first and second containers to a delivery point, comprising:
   a) placing the first and second containers in flow communication with a high pressure header;
   b) placing at least said first container in flow communication with a low pressure header;
   c) opening the first container, wherein the first container is in flow communication with the delivery point through at least the high pressure header;
   d) opening the second container when an output from the first container reaches a predetermined pressure, wherein the second container is in flow communication with the delivery point through said high pressure header and an ejector;
   e) switching the first container from the high pressure header to the low pressure header, wherein the first container is in flow communication with the delivery point through the low pressure header, and wherein the ejector creates suction that assists the flow of residual compressed gas from the first container.

12. The method of claim 11, wherein steps (d) and (e) occur simultaneously.

13. The method of claim 11, further comprising sensing the pressure at an ejector motive gas inlet, wherein steps (d) and (e) occur when the pressure at the ejector motive gas inlet reaches a predetermined point.

14. The method of claim 11, further comprising maintaining a predetermined gas flow rate at a diffuser outlet of the ejector.

15. The method of claim 11, further comprising compressing gas from a diffuser outlet of the ejector to reach a predetermined pressure.

16. The method of claim 11, further comprising compressing container gas output to a predetermined pressure, wherein the container gas is in flow communication with the delivery point through a compressor.

17. The method of claim 11, further comprising heating the compressed gas when gas temperature falls below a predetermined level.

18. The method of claim 11, wherein the containers comprise container banks, each container bank having a container bank header, wherein each container bank header has a separate connection to the high pressure header and a separate connection to the low pressure header.

19. A system for unloading compressed gas comprising:
   a high pressure header;
   a low pressure header;
   a plurality of means for holding compressed gas, wherein at least one of the means for holding is in flow communication with the high pressure header and the low pressure header;
   means for creating suction, wherein the means for creating suction assists in removing residual gas from the means for holding compressed gas.

20. The system for unloading of claim 19, further comprising computer control means for selectively adjusting the flow of compressed gas out of at least one of the means for holding and into the high pressure header and low pressure header.

* * * * *